United States Patent [19]  [11] 3,936,513
Lorenz et al.  [45] Feb. 3, 1976

[54] GLOSS-STABILISED FIBRES AND FILMS OF ACRYLONITRILE COPOLYMERS

[75] Inventors: Günter Lorenz, Dormagen; Siegfried Korte, Leverkusen; Carlhans Süling, Odenthal-Hahnenberg, all of Germany

[73] Assignee: Bayerwerk Aktiengesellschaft, Leverkusen, Germany

[22] Filed: June 19, 1973

[21] Appl. No.: 371,547

[30] Foreign Application Priority Data
June 19, 1972 Germany............................ 2229800

[52] U.S. Cl............................. 260/898; 260/89.5 S
[51] Int. Cl.$^2$......................................... C08L 33/24
[58] Field of Search................................... 260/898

[56] References Cited
UNITED STATES PATENTS

| | | | |
|---|---|---|---|
| 2,831,826 | 4/1958 | Coover et al. | 260/32.8 |
| 3,580,878 | 5/1971 | Nakanome et al. | 260/29.6 |
| 3,718,717 | 2/1973 | Logemann | 260/898 |
| 3,729,531 | 4/1973 | Suling et al. | 260/898 |

Primary Examiner—Carman J. Seccuro
Attorney, Agent, or Firm—Plumley & Tyner

[57] ABSTRACT

Vacuole-free films, filaments and fibers consisting of a polymer mixture which comprises a copolymer of acrylonitrile and a polymer which is obtained by a polymer-analogue reaction of a polyacrylic acid ester with dimethylamine, said polymer containing from 40–99 mol % of N,N-dimethyl acrylamide units.

12 Claims, No Drawings

GLOSS-STABILISED FIBRES AND FILMS OF ACRYLONITRILE COPOLYMERS

This invention relates to vacuole-free filaments and films of a polymer mixture of an acrylonitrile copolymer with a polymer of a polyacrylic acid ester and dimethylamine.

Films, fibres and filaments produced from acrylic and modacrylic polymers often lose their gloss and appear dull when they come into contact with hot water or steam at elevated temperature. This applies in particular to fibre materials produced from acrylonitrile/vinylidene chloride copolymers, acrylonitrile/vinyl chloride copolymers and acrylonitrile/vinyl bromide copolymers, which are important in the production of substantially non-inflammable articles. The undesirable dullness is produced by extremely small cavities known as vacuoles which are formed inside the shaped articles under the external conditions mentioned above. Shaped articles such as filaments are inevitably exposed to the effect of hot water or steam during processing, for example during stretching and crimping in the case of filaments, during dyeing in the case of the yarns produced from them and during washing and ironing in the case of the finished fabrics. The dulling effect of the vacuoles is uncontrollable and would appear to be governed to a large extent by the external conditions, for example by the intensity with which and the temperature at which the water comes into contact with the filaments or films, so that the articles produced from the filaments or films are uneven in their appearance.

It has now been found that the formation of the vacuoles in fibres or films of copolymers of acrylonitrile with from 20 to 80 % by weight of vinylidene chloride and/or vinyl chloride and/or vinyl bromide can be significantly reduced or even completely avoided by adding, to the spinning solutions of the acrylonitrile copolymers and organic solvents, polymers containing N,N-dimethyl acrylamide, which are obtained by the polymer-analogue reaction of polyacrylic acid esters, especially polyacrylic acid methyl ester, with dimethylamine. These gloss-stabilising additives can contain from 40 to 99 mol % of N,N-dimethyl acrylamide units in the polymer chain and develop their activity when added to the film- and fibre-forming acrylonitrile copolymers in a quantity of from 4 to 20 % by weight.

It is an object of this invention to provide vacuole-free fibers, films and filaments.

Further objects will be evident from the description and the examples.

These objects are accomplished by fibers, films and filaments consisting of a polymer mixture which comprises:
a. from 80 to 96 % by weight of a copolymer of acrylonitrile with from 20 to 80 % by weight of a member selected from the group consisting of vinylidene chloride, vinyl chloride, vinyl bromide and a mixture of these, and, optionally, with from 0 to 5 % by weight of a monomer selected from the group consisting of a monomer with at least one functional acid group, a monomer with at least one functional basic group and a monomer with at least one functional acid and basic group, and
b. from 20 to 4 % by weight of a polymer containing N,N-dimethyl acrylamide units obtained by the polymer-analogue reaction of polyacrylic acid esters, preferably polyacrylic acid methyl ester, with dimethylamine. The amide units can amount to between 40 and 99 mol %.

The molecular weight of the amide-containing copolymers added in accordance with the invention can vary within wide limits. Generally, polymers with K-values (according to H. Fikentscher, Cellulosechemie 13 (1932), page 58) of from 10 to 100 are effective, polymers with a K-value of from 30 to 70 being particularly favourable.

The quantity of additive required to produce adequate gloss stabilisation in the film- and fibre-forming base material (a) is governed to a crucial extent by the N,N-dimethyl acrylamide content of the added polymer component (b). The quantity required is smaller, the higher the N,N-dimethyl acrylamide group content of the polymer. In the case of the polymers (b), the greatest effectiveness, which is governed to a lesser extent by the composition of the base material a), is obtained with a content of amide units of from 60 to 99 mol %, for example 60 to 90 mol %, but also 90.1 to 99 mol %. In these cases, vacuole-free filaments and films are obtained with an addition of as little as 4 to 10 % by weight.

Suitable organic solvents which can be used for the preparation of the spinning solutions from the mixtures according to the invention include the usual polar solvents for polyacrylonitrile, such as dimethyl formamide, dimethyl acetamide, ethylene carbonate, γ-butyrolactone, dimethyl sulfoxide or hexamethyl phosphoric acid triamide. Acetone, cyclohexanone or tetrahydrofuran, for example, can also be used as the solvents.

Although it is known to be possible by adding 5 to 30 parts by weight of a homopolymer of a (meth)acrylamide of the general formula (I):

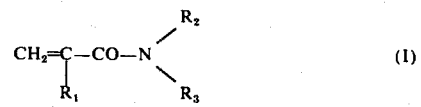

in which $R_1$ represents hydrogen or $CH_3$ whilst $R_2$ and $r_3$, represent hydrogen or an alkyl group with 1 to 6 carbon atoms, or by adding at least 50 % copolymers of these (meth)acrylamides to 70 to 95 parts by weight of copolymers of acrylonitrile with vinylidene chloride or vinyl chloride, to improve the hydrophilicity and dyeability of filaments and fibres of polymer mixtures such as these, the gloss-stabilising effect of these amide-containing polymers, i.e. the elimination of troublesome vacuole formation during the treatment of films and filaments of modacrylic polymers with hot water or steam, is not mentioned in DAS No. 1,059,614, nor is it achieved by the majority of the amide-containing polymers described, instead it is unique to dimethyl acrylamide homopolymers and a few special dimethyl acrylamide copolymers.

Neither do graft polymers, for example of acrylonitrile and acrylamides, either as such or as additives to fibre-forming acrylonitrile polymers, produce the adequate technical effect which is obtained in accordance with the invention by the addition of N,N-dimethyl acrylamide copolymers obtained by polymer-analogue reaction. The films and filaments of polymer mixtures according to the invention differ basically from films and filaments of known polymers in that the films and filaments according to the invention consist of polymer mixtures which do not contain any graft polymer.

It is also known that homopolymers and copolymers of N,N-dimethyl acrylamide containing from 0 to 80 mol % of acrylonitrile can be used as gloss-stabilising additives for copolymers of acrylonitrile containing from 20 to 80 % by weight of vinylidene chloride and-/or vinyl chloride, reference having been made to their specific activity within the group of polymers containing N-monosubstituted or -disubstituted (meth) acrylamides.

It has now been found that other copolymers of N,N-dimethyl acrylamide, above all those materials which are obtained by copolymerisation with (meth) acrylic acid esters, give vacuole-free films and filaments when added in relatively high concentrations to the film- or fibre-forming base material. Thus, an adequate effect can be obtained with N,N-dimethyl acrylamide/acrylic acid methyl ester copolymers containing from 70 to 90 mol % of the amide component by an addition of at least 15 % by weight.

It was surprising that polymers obtained by the polymeranalogue reaction of polyacrylic acid esters, especially polyacrylic acid methyl ester, with dimethylamine should produce the required gloss stabilisation in a much lower concentration of from 5 to 10 % by weight, despite their comparable amide content.

Fractionation tests have shown that the reaction products of polyacrylic acid alkyl esters and dimethylamine do not have a high chemical uniformity. Thus, the amide content of the relatively high molecular weight fractions distinctly decreases, in other words the degree of reaction of the relatively high molecular weight polyacrylic acid ester fractions is appreciably lower. A polymerisation composition of this kind cannot be obtained by copolymerising the monomers by conventional processes, nor is it generally sought. In the present case, however, it must be regarded as favourable because it is possible in this way to produce vacuole-free films and filaments with much smaller additions.

The frequently inadequate dyeability of the claimed fibers, filaments and films can be obtained in a known manner in the present base material by copolymerising small quantities, generally about 1 to 3 % by weight, of a monomer with acid or basic groups, for example styrene sulfonic acid, a disulfonimide, vinyl pyridine or a sulfobetaine.

Adverse effects upon the properties of the films and fibres, for example increased shrinkage or reduced flameresistance of the materials, do not occur by virtue of the addition of the N,N-dimethyl acrylamide copolymers obtained by polymer-analogue reaction, which must be regarded as another advantage of the process according to the invention for the production of vacuole-free films, fibers and filaments.

The effectiveness of the N,N-dimethyl acrylamide-containing polymers in preventing vacuole formation can be tested on film materials. The aftertreatment stages through which the fibres pass during their production are largely simulated in the following test:

1. Film formation from dimethyl formamide solution (50°C)
2. Stretching the film material in boiling water in a ratio of 1:4
3. Boiling the film strips stretched across frames for 1 hour in boiling water
4. Drying the test strips at 50°C (1 hour)
5. Tempering the film strips at 140°C (20 minutes)
6. Boiling the films in boiling water (1 hour)
7. Drying the film strips at 50°C (30 minutes)

After the last two treatment stages (6 and 7), gloss-stable film materials should not show any more signs of hazing and should be clearly transparent and glossy. The quality of the films is assessed on an arbitrary scale in which 0 stands for no visible hazing caused by vacuoles, whilst 8 stands for very pronounced hazing by numerous vacuoles.

| Mark | Appearance of the film specimens |
|---|---|
| 8 | brilliant white, no gloss |
| 7 | white, no gloss |
| 6 | pale white, no gloss |
| 5 | transparent, still hazy, still no gloss |
| 4 | transparent, still slightly hazy with some gloss |
| 3 | almost clear with some gloss |
| 2 | almost clear, glossy |
| 1 | clear, glossy |
| 0 | clear with high gloss |

The K-values of the polymers quoted in the following Examples were determined at 25°C in 0.5 % dimethyl formamide solution according to Fikentscher, Cellulosechemie 13 (1932), page 58.

The following examples are to further illustrate the invention without limiting it.

EXAMPLE 1

Production of an N,N-dimethyl Acrylamide Copolymer by Polymer-analogue Reaction 240 g of polyacrylic acid methyl ester (molecular weight $\overline{M}_v = 250,000$), dissolved in 1360 g of dimethyl formamide, are reacted with 140 g of dimethylamine in a three litre titanium shaker-type autoclave. The molar excess of dimethylamine amounts to 10 %. At a reaction temperature of 180°C, the internal pressure in the reaction vessel initially rises to 20 atms. and then falls with increasing degree of reaction to approximately 10 atms. After 8 hours, a pale yellow coloured reaction solution is recovered, a polymer with a nitrogen content of 11.4 % being isolated from it. The polymer consists of 80 % by weight of N,N-dimethyl acrylamide units and forms a clear solution in methanol and water and has a K-value of 73.5. ( Copolymerisate B )

EXAMPLE 2

10 % solutions in dimethyl formamide were prepared from the following polymer mixtures consisting of a copolymer (A) of 58.5 % by weight of acrylonitrile, 38.5 % by weight of vinylidene chloride and 3 % by weight of methacrylaminobenzene benzene disulfonimide with a K-value of 92.5, and of the polymeric additive component ( copolymerisate B ) as prepared in Example 1.

|  | I | II | III | IV | V |
|---|---|---|---|---|---|
| % by weight (A) | 100 | 95 | 90 | 85 | 80 |
| % by weight (B) | 0 | 5 | 10 | 15 | 20 |

The gloss-stabilising effect of component (B) is determined by the test method described on page 8. The appearance of the films after the various treatment stages can be assessed as in Table (I)

Table (I)

|     | Films boiled for 1 hour moist | Films boiled for 1 hour dry | tempered at 140°C | Boiled for 1 hour moist | Boiled for 1 hour dry |
| --- | --- | --- | --- | --- | --- |
| I   | 8 | 8 | 5 | 8 | 8 |
| II  | 7 | 7 | 3 | 5 | 5 |
| III | 6 | 6 | 1 | 2 | 2 |
| IV  | 4 | 3 | 1 | 1 | 1 |
| V   | 2 | 2 | 0 | 1 | 0 |

A vacuole-free glossy film can be obtained with 10 % of component (B) obtained by polymer-analogue reaction.

Comparison Example 1

Production of an N,N-dimethyl Acrylamide/Acrylic Acid Methyl Ester Copolymer 16.5 parts by weight of N,N-dimethyl acrylamide and 3.5 parts by weight of acrylic acid methyl ester are polymerised in 100 parts by volume of tert.-butanol over a period of 8 hours under nitrogen at a temperature of 80°C following the addition of 0.03 parts by weight of azodiisobutyrodinitrile. The viscous solution is diluted with 100 parts by volume of methanol. The polymer is isolated by precipitation from petroleum ether. An N,N-dimethyl acrylamide/acrylic acid methyl ester copolymer containing 81 % by weight of amide is obtained. K-value: 71.0, Yield: 89 %. ( Copolymerisate C )

Comparison Example 2

10 % solutions in dimethyl formamide are prepared from the following polymer mixtures consisting of a copolymer (A) of example 2, consisting of 58.5 % by weight of acrylonitrile, 38,5% by weight of vinylidene chloride and 3 % by weight of methacrylaminobenzene benzene disulfonimide with a K-value of 92.5, and of the copolymer (C) as prepared in Comparison Example 1.

|              | I   | II | III | IV | V  |
| ---          | --- | --- | --- | --- | --- |
| % by weight (A) | 100 | 95 | 90 | 85 | 80 |
| % by weight (C) | 0   | 5  | 10 | 15 | 20 |

The gloss-stabilising effect of component (C) obtained by copolymerisation is determined by the test method described on page 8. The appearance of the films after the various treatment stages can be assessed as in Table (II).

Table (II)

|     | Films boiled for 1 hour moist | Films boiled for 1 hour dry | tempered at 140°C | Boiled for 1 hour moist | Boiled for 1 hour dry |
| --- | --- | --- | --- | --- | --- |
| I   | 8 | 8 | 6 | 8 | 8 |
| II  | 8 | 8 | 5 | 8 | 8 |
| III | 7 | 7 | 3 | 4 | 4 |
| IV  | 4 | 4 | 1 | 2 | 1 |
| V   | 2 | 2 | 0 | 1 | 0 |

The product (C) obtained by the copolymerisation of N,N-dimethyl acrylamide and acrylic acid methyl ester only produces an adequate gloss-stabilising effect when added in a quantity of 15 %.

EXAMPLE 3

Polymers differing in their N,N-dimethyl acrylamide content are produced as in Example 1 by the polymer analogue reaction of polyacrylic acid methyl ester with varying quantities of dimethylamine. They can be characterised as follows:

| N,N-dimethylacrylamide content [% by weight] | K-value |
| --- | --- |
| (D) 52 | 65 |
| (E) 68 | 66 |
| (F) 86 | 70 |
| (G) 94 | 68 |

10 % solutions in dimethyl formamide are prepared from polymer mixtures consisting of a copolymer (A) of example 2 consisting of 58.5 % by weight of acrylonitrile, 38.5 % by weight of vinylidene chloride and 3 % by weight of methacrylaminobenzene benzenedisulfonimide (K-value 92.5), with 5 or 10 % by weight of the polymeric additives (D), (E), (F) or (G). The dulling of the films prepared from the solutions is assessed in Table (III) by the test described.

Table (III)

|              | Films boiled for 1 hour moist | Films boiled for 1 hour dry | tempered at 140°C | Boiled for 1 hour moist | Boiled for 1 hour dry |
| --- | --- | --- | --- | --- | --- |
| no addition   | 8 | 8 | 5 | 8 | 8 |
| with 5 % (D)  | 8 | 8 | 5 | 8 | 8 |
| with 10 % (D) | 6 | 6 | 4 | 5 | 5 |
| with 5 % (E)  | 6 | 6 | 4 | 5 | 4 |
| with 10 % (E) | 5 | 4 | 2 | 3 | 2 |
| with 5 % (F)  | 6 | 6 | 2 | 5 | 4 |
| with 10 % (F) | 5 | 4 | 1 | 2 | 1 |
| with 5 % (G)  | 5 | 5 | 2 | 2 | 2 |
| with 10 % (G) | 2 | 2 | 0 | 1 | 0 |

EXAMPLE 4

10 % solutions in dimethyl formamide are prepared from a copolymer (H), obtained by emulsion polymerisation, of 55 % by weight of vinyl chloride and 45 % by weight of acrylonitrile with a K-value of 68, without and with additions of 5, 10, 15 and 20 % by weight of the copolymer (B) described in Example 1. The quantity of the films prepared from these solutions is assessed in Table (IV) by the test method described on page 8:

Table (IV)

|              | Films boiled for 1 hour moist | Films boiled for 1 hour dry | tempered at 140°C | Boiled for 1 hour moist | Boiled for 1 hour dry |
| --- | --- | --- | --- | --- | --- |
| no addition | 6 | 6 | 4 | 5 | 5 |
| with 5%     | 6 | 6 | 3 | 4 | 4 |
| with 10 %   | 5 | 5 | 2 | 3 | 2 |
| with 15 %   | 4 | 3 | 1 | 1 | 1 |
| with 20 %   | 2 | 2 | 0 | 0 | 0 |

EXAMPLE 5

10 % solutions in dimethyl formamide were prepared from the following polymer mixtures consisting of a copolymer (J) of 58 % by weight of acrylonitrile, 27 % by weight of vinylidene chloride, 12 % by weight of vinyl bromide and 3 % by weight of methacrylaminobenzene benzenedisulfonimide with a K-value of 93.5, and of the polymeric additive component (B) described in Example 1.

|              | I   | II | III | IV | V  |
| ---          | --- | --- | --- | --- | --- |
| % by weight (J) | 100 | 95 | 90 | 85 | 80 |
| % by weight (B) | 0   | 5  | 10 | 15 | 20 |

The gloss-stabilising effect of component (B) is determined by the test method described. The appearance of the films after the various treatment stages can be assessed as in Table (V).

Table (V)

| | Films boiled for 1 hour | | tempered at 140°C | Boiled for 1 hour | |
|---|---|---|---|---|---|
| | moist | dry | | moist | dry |
| I | 8 | 8 | 6 | 8 | 8 |
| II | 7 | 7 | 4 | 6 | 7 |
| III | 6 | 6 | 3 | 4 | 3 |
| IV | 5 | 4 | 2 | 2 | 2 |
| V | 3 | 3 | 0 | 1 | 0 |

EXAMPLE 6

30 % spinning solutions in dimethyl formamide of the following composition are prepared from a copolymer (A) of example 2, consisting of 58.7 % by weight of acrylonitrile, 38.3 % by weight of vinylidene chloride and 3 % by weight of methacrylaminobenzene benzenedisulfonimide with a K-value of 93.5, and of a polymer (K) prepared in accordance with Example 1 with an N,N-dimethyl acrylamide content of 81 % by weight and a K-value of 75.0.

| | parts by weight (A) | parts by weight (K) | parts by weight DMF |
|---|---|---|---|
| I | 3000 | 0 | 7000 |
| II | 2775 | 225 | 7000 |
| III | 2700 | 300 | 7000 |
| IV | 2625 | 375 | 7000 |

These solutions are spun in known manner from a spinneret with 120 holes of 0.25 mm in diameter in a spinning duct heated to 165°C into filaments with a spinning denier of 9.4 dtex, run off at a rate of 200 m/minute and wound up. The filaments thus obtained are stretched in a ratio of 1:3.7 in boiling water, passed through a washingwater bath at 80°C and a preparation bath at 60°C and then dried in a hot-air dryer at 140°C and wound up. Filaments with a circular cross section and a glossy appearance are obtained. When the bundle of filaments is immersed in a mixture of 30 parts by weight of chlorobenzene and 70 parts by weight of o-nitrotoluene, the filaments become transparent and the mixture appears homogeneous, in other words no vacuoles are present in the filaments.

In order to test their gloss stability, samples of the films obtained as described above are boiled for 30 minutes in a boiling water bath, compressed between filter paper and then dried for 1 hour at 50°C in a recirculatingair drying cabinet. The samples are visually assessed in regard to their appearance and, in order to reveal the vacuole content, are immersed in the mixture of 30 % of chlorobenzene and 70 % of nitrotoluene. The filament haze revealed in this way is assessed on the basis of a 0 to 10 scale, 0 standing for complete transparency and 10 for complete opacity. Result:

| | | Haze mark | Appearance |
|---|---|---|---|
| I | no addition | 10 | dull white |
| II | with 7.5 % of (K) | 5 | white, with high surface gloss |
| III | with 10.0 % of (K) | 3 | glossy with a few white streaks |
| IV | with 12.5 % of (K) | 1 | glossy |

The following process can be used to reveal more clearly the differences in gloss: the glossy stretched filaments are re-wound on to perforated metal spools until about 5 layers have been applied. The ends of the filaments are knotted together. The spools are then introduced into an already boiling water bath in which they are boiled for 30 minutes. After drying at 50°C, even slight differences in gloss can readily be recognised through the parallel position of the filaments. Visual assessment gives the following results:

I dull, white, low surface gloss
II opalescent, high surface gloss
III glossy with only a few isolated hazy capillaries
IV completely glossy as before boiling.

EXAMPLE 7

36 % spinning solutions in dimethyl formamide of the following composition are prepared from a copolymer (L) of 58.1 % by weight of vinyl chloride and 41.5 % by weight of acrylonitrile with a K-value of 70.5 and of a polymer (M) obtained in accordance with Example 1 with 79 % by weight of N,N-dimethyl acrylamide units and a K-value of 64:

| | parts by weight (L) | parts by weight (M) | parts by weight DMF |
|---|---|---|---|
| I | 3600 | — | 6400 |
| II | 3312 | 288 | 6400 |
| III | 3240 | 360 | 6400 |

In accordance with Example 6, these solutions are spun into filaments with a spinning denier of 9.6 dtex, stretched in a ratio of 1:4 in boiling water, washed, prepared and dried for 75 seconds at 140°C in a hot-air cylinder dryer. The filaments are glossy and have a round cross section.

The testing method described in Example 6 gives the following results:

1. Vacuole test in the mixture of 30 % of chlorobenzene and 70 % of nitrotoluene

| | | Haze mark | Appearance |
|---|---|---|---|
| I | no addition | 10 | dull, white |
| II | with 8% of (M) | 4 | opalescent with high surface gloss |
| III | with 10% of (M) | 1 | glossy |

2. Spool gloss test
I matt, white
II opalescent, high surface gloss
III glossy.

What we claim is:
1. A synthetic film, fiber or filament comprising a mixture of
   a. from 80 to 96% by weight of a copolymer of acrylonitrile with from 20 to 80% by weight of vinylidene chloride, vinyl chloride, vinyl bromide or a mixture of these, and with from 0 to 5% by weight of a monomer with at least one functional acid group, a monomer with at least one functional basic group or a monomer with at least one functional acid and basic group; and b. from 20 to 4% by weight of a polymer obtained by reacting a polyacrylic acid ester with dimethylamine under conditions which result in said polymer (b) containing 40 to 90 mol % of N,N-dimethylacrylamide units; said film, fiber or filament having improved gloss characteristics compared to the corresponding film, fiber or filament in which the (b) component is a polymer prepared by conventional addition copolymerization of the acrylic acid ester and N,N-dimethylacrylamide.

2. A synthetic film, fiber or filament comprising a mixture of a. from 80–96% by weight of a copolymer of acrylonitrile with from 20–80% by weight vinylidene chloride, vinyl chloride, vinyl bromide or a mixture of these; and b. from 20–4% by weight of a polymer obtained by reacting polyacrylic acid ester with dimethylamine under conditions which result in said polymer (b) containing 40 to 90 mol % of N,N-dimethylacrylamide units; said film, fiber or filament having improved gloss characteristics compared to the corresponding film, fiber or filament in which the (b) component is a polymer prepared by conventional addition copolymerization of the acrylic acid ester and N,N-dimethylacrylamide.

3. A process for the production of a vacuole-free film, fiber or filament which comprises dissolving a polymer mixture containing an acrylonitrile copolymer in a polar organic solvent and shaping said film, fiber or filament from the solution thus obtained, said polymer mixture containing an acrylonitrile copolymer comprising a. from 80–96% by weight of a copolymer of acrylonitrile with from 20 to 80% by weight of vinylidene chloride, vinyl chloride vinyl bromide or a mixture thereof, and with from 0 to 5% by weight of a monomer having at least one functional acid group, having at least one functional basic group and having at least one functional acid and basic group; and b. from 20 to 4% by weight of a polymer obtained by reacting a polyacrylic acid ester with dimethylamine under conditions which result in said polymer (b) containing 40 to 90 mol % of N,N-dimethylacrylamide units; said film, fiber or filament having improved gloss characteristics compared to the corresponding film, fiber or filament in which the (b) component is a polymer prepared by conventional addition copolymerization of the acrylic acid ester and N,N-dimethylacrylamide.

4. A process for the production of a vacuole-free film, fiber or filament which comprises dissolving a polymer mixture containing an acrylonitrile copolymer in a polar organic solvent and shaping said film, fiber or filament from the solution thus obtained, said polymer mixture containing an acrylonitrile copolymer comprising a. from 80–96% by weight of a copolymer of acrylonitrile with from 20 to 80% by weight of vinylidene chloride, vinyl chloride, vinyl bromide or a mixture thereof; and b. from 20–4% by weight of a polymer obtained by reacting polyacrylic acid ester with dimethylamine under conditions which result in said polymer (b) containing 40 to 90 mol % of N,N-dimethylacrylamide units; said film, fiber or filament having improved gloss characteristics compared to the corresponding film, fiber or filament in which the (b) component is a polymer prepared by conventional addition copolymerization of the acrylic acid ester and N,N-dimethylacrylamide.

5. The synthetic film, fiber and filament of claim 1, in which said polyacrylic acid ester is polyacrylic acid methyl ester.

6. The synthetic film, fiber and filament of claim 2, in which said polyacrylic acid ester is polyacrylic acid methyl ester.

7. The synthetic film, fiber and filament of claim 1, in which said component (b) has a K-value (according to Fikentscher CELLULOSECHEMIE 13 (1932), page 58) of from 10 to 100.

8. The synthetic film, fiber and filament of claim 2, in which said component (b) has a K-value (according to Fikentscher CELLULOSECHEMIE 13 (1932), page 58) of from 10 to 100.

9. The synthetic film, fiber and filament of claim 1, in which said component (b) contains 60 to 90 mol % of dimethylacrylamide units.

10. The synthetic film, fiber and filament of claim 2, in which said component (b) contains 60 to 90 mol % of dimethylacrylamide units.

11. The synthetic film, fiber or filament of claim 1 in which said component (b) comprises 5 to 10% by weight of said polymer mixture.

12. The synthetic film, fiber or filament of claim 2, in which said component (b) comprises 5 to 10% by weight of said polymer mixture.

* * * * *